Oct. 8, 1929. H. E. DUNN 1,730,562
ICE CREAM CONTAINER
Filed Dec. 22, 1927
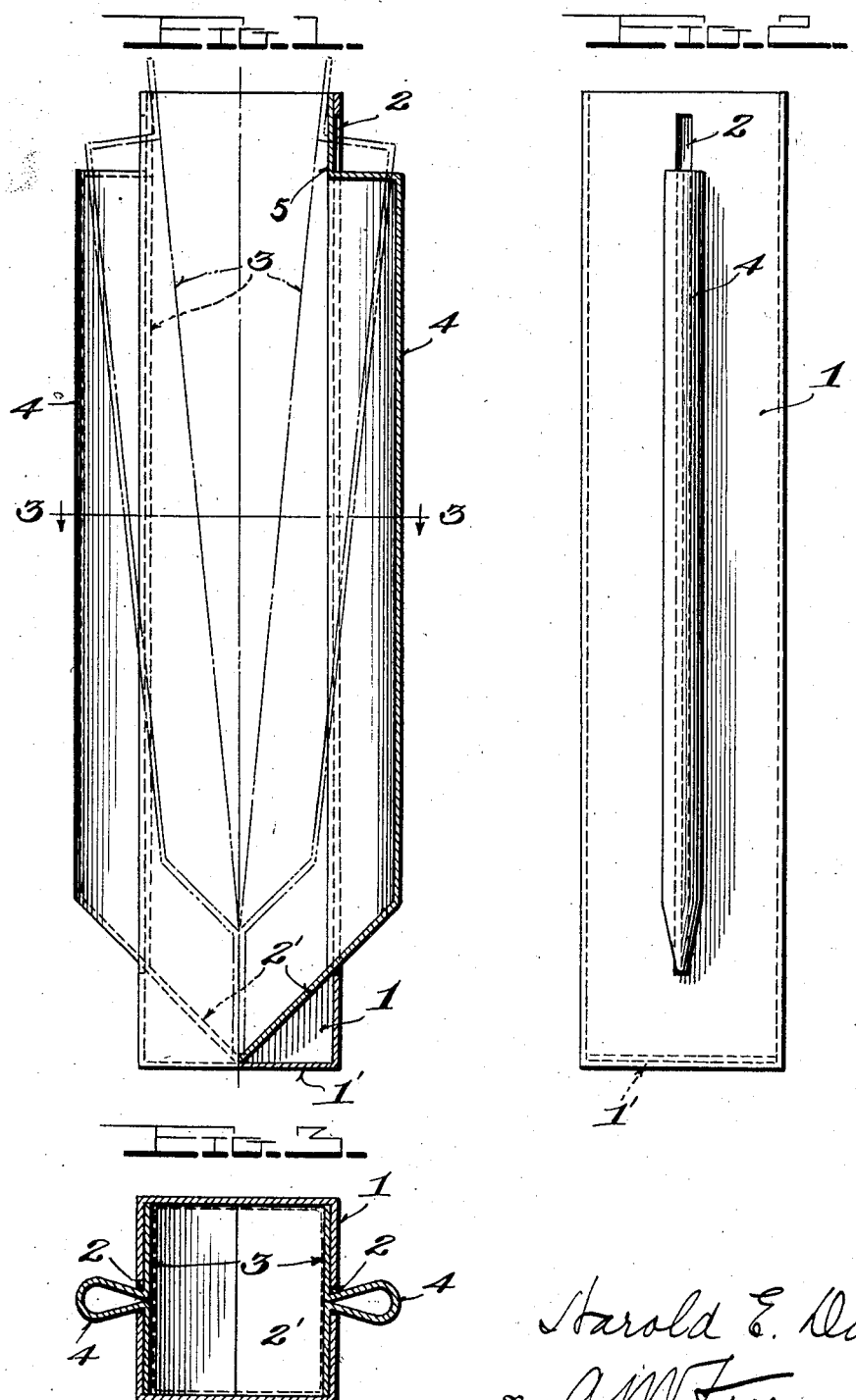

Patented Oct. 8, 1929

1,730,562

UNITED STATES PATENT OFFICE

HAROLD E. DUNN, OF SIOUX FALLS, SOUTH DAKOTA

ICE-CREAM CONTAINER

Application filed December 22, 1927. Serial No. 241,936.

This invention relates to improvements in ice cream containers and more especially to the type in which the container is held in the hand during eating of the ice cream.

The primary object of the invention is to provide a container which has means therein operable from the exterior of the container for gradually expelling or ejecting the ice cream during consumption thereof, by compression thereof from opposite sides of the bottom of the container towards the top of the latter, thereby to squeeze and progressively eject the ice cream through the top of the container.

A further object of the invention is to provide a device of this type wherein the original shape or form of the container is maintained throughout, thereby to provide a holder which remains constant or unvarying and consequently affords a hand hold which retains its original form or hand grip throughout.

In the drawings:—

Fig. 1 is a view partially in front elevation and in vertical section of the invention;

Fig. 2 is a side elevation, and

Fig. 3 is a section on line 3—3 of Fig. 1.

In proceeding in accordance with the present invention, a preferably light card-board container 1 is employed which is of square or rectangular cross-section and which has a closed bottom 1', its top being open.

Opposite side walls of the container are formed with longitudinal slots 2, which latter preferably terminate short of the top of the container.

The expelling or ejecting means consists of a generally U-shaped element the sides 3 of which are formed with centrally disposed outwardly extending finger-engaging or presser elements 4. The presser elements are disposed longitudinally of the expeller and project outwardly through the container slots as depicted in the drawings.

The bottom 2' of the expeller is preferably of V-shape and seats on the bottom of the container. The expeller is formed of flexible material, such as card-board, although like the container, same may be formed of any other suitable light, bendable or flexible material. The presser ribs or members 4 may be formed by bending intermediate portions of the sides of the expeller outwardly as shown in Fig. 3.

The expeller has its sides of substantially the same width as those of the adjacent sides of the container and is adapted to receive a brick or body of ice cream therein.

In operation, the sides of the expeller at the bottoms thereof are pressed towards each other by pressure exerted by the fingers on the presser members or ribs 4 so that the expeller sides have an upward divergent relation, whereby the ice cream will be squeezed or compressed between the expeller sides and ejected. As the ice cream is consumed further pressure is exerted by the fingers on the expeller sides, to thereby progressively eject the ice cream as desired.

It will be noted that the original form of the container is preserved throughout, and consequently a constant or unvarying hand grip is provided.

Preferably the presser members 4, as shown in Fig. 1, terminate below the upper ends of the sides 2 of the expeller, so that the upper ends 5 of the expeller engage the container and limit outward movement of the expeller sides 3.

The flexible nature of the expeller sides 3 permits the latter to follow, so to speak, the bottom of the ice cream body as the latter is ejected, or to force same out of the container from the bottom of the ice cream body as clearly shown in Fig. 1 of the drawings in dotted lines.

What is claimed is:—

1. A container for compressible materials including a body having slots in two of its opposed sides, and a U-shaped expeller in the body, the sides of the expeller being bent along longitudinal lines central of the width thereof to form ribs which latter extend through the slots, said ribs extending throughout substantially the length of the expeller sides so as to expel the material by direct pressure thereagainst progressively exerted from the bottom to the top of the container.

2. A container for compressible materials including a body having slots in two of its opposed sides, an expeller in the body having opposed parts, and finger engaging means connected to said parts and extending through the respective slots, said finger engaging means extending throughout substantially the length of the expeller parts so as to expel the material by direct pressure thereagainst and progressively exerted from the bottom to the top of the container.

3. A container for compressible materials including a body of substantially square cross-section formed to receive and have two of its opposite sides directly engage the material and having slots in its other sides, and an expeller in the body having parts in juxtaposition to said slotted sides of the body the edges of said parts engaging the surface of said first named sides of the body so as to expel the material in conjunction with said first named sides, and finger engaging means connected to said expeller parts and projecting through said slots and extending throughout substantially the length of said parts whereby to expel the material by direct pressure thereagainst and progressively exerted from the bottom to the top of the body.

4. A container for compressible materials including a body of substantially square cross-section formed to receive and have two of its opposite sides directly engage the material, and means to expel the material having opposed parts which engage the material and which have their edges engaging the surfaces of said first named sides of the body so as to expel the material in conjunction with said first named sides.

In testimony whereof I affix my signature.

HAROLD E. DUNN.